US009301126B2

(12) United States Patent
Scarr et al.

(10) Patent No.: US 9,301,126 B2
(45) Date of Patent: Mar. 29, 2016

(54) DETERMINING MULTIPLE USERS OF A NETWORK ENABLED DEVICE

(71) Applicant: Vodafone IP Licensing Limited, London (GB)

(72) Inventors: Kevin Tristan Scarr, London (GB); Oleksiy Ignatyev, Belmont, CA (US); Volkmar Scharf-Katz, San Francisco, CA (US)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 76 days.

(21) Appl. No.: 14/310,509

(22) Filed: Jun. 20, 2014

(65) Prior Publication Data
US 2015/0373529 A1 Dec. 24, 2015

(51) Int. Cl.
*H04M 3/42* (2006.01)
*H04W 8/18* (2009.01)
(Continued)

(52) U.S. Cl.
CPC *H04W 8/18* (2013.01); *H04W 4/02* (2013.01); *H04W 4/16* (2013.01); *H04W 24/08* (2013.01)

(58) Field of Classification Search
CPC ........... H04N 21/44222; H04W 24/08; H04W 16/04; H04W 28/0226; H04W 72/0486
USPC ................................ 455/456.3, 456.1, 73, 99
See application file for complete search history.

(56) References Cited

U.S. PATENT DOCUMENTS 7,594,121 B2 9/2009 Eytchison et al.
7,818,206 B2 10/2010 Smith et al.
(Continued)

FOREIGN PATENT DOCUMENTS

AU 2013100258 4/2013
CN 1878096 12/2006
(Continued)

OTHER PUBLICATIONS

Hofgesang, Peter I. et al; "Online Change Detection in Individual Web User Behaviour;" VU University Amsterdam, Department of Computer Science; Beijing, China; Apr. 21-25, 2008.
(Continued)

*Primary Examiner* — Joseph Arevalo
(74) *Attorney, Agent, or Firm* — Workman Nydegger

(57) ABSTRACT

Methods of predicting a change of users of a network enabled device and a network and network device configured to perform the methods. A present device category and a present device demographic profile are associated with the network enabled device. The present device category is one of a plurality of predefined categories each having a demographic profile associated therewith. The method includes: detecting a network event corresponding to the network enabled device; determining an event category corresponding to the detected network event, the event category being one of the plurality of predefined categories; and comparing the event category with the present device category. When the event category differs from the present device category, determining a new demographic profile based on the present device demographic profile and the demographic profile associated with the event category; and comparing the new demographic profile with the present device demographic profile. When the new demographic profile differs from the present device demographic profile, setting forth an alert predicting a change of users of the network enabled device.

17 Claims, 10 Drawing Sheets

(51) Int. Cl.
*H04W 24/08* (2009.01)
*H04W 4/16* (2009.01)
*H04W 4/02* (2009.01)

(56) References Cited

U.S. PATENT DOCUMENTS

| | | |
|---|---|---|
| 8,301,692 B1 | 10/2012 | Hamaker et al. |
| 8,321,958 B1 | 11/2012 | Fleming et al. |
| 8,341,196 B2 | 12/2012 | Immonen et al. |
| 2003/0058096 A1 | 3/2003 | Shteyn |
| 2003/0083938 A1 | 5/2003 | Smith et al. |
| 2007/0208728 A1 | 9/2007 | Zhang et al. |
| 2008/0047009 A1 | 2/2008 | Overcash et al. |
| 2008/0126411 A1 | 5/2008 | Zhuang et al. |
| 2009/0024546 A1 | 1/2009 | Ficcaglia et al. |
| 2009/0190750 A1* | 7/2009 | Xie ................ H04M 3/5232 379/266.03 |
| 2009/0293121 A1 | 11/2009 | Bigus et al. |
| 2010/0054453 A1* | 3/2010 | Stewart ........... H04M 3/5232 379/265.12 |
| 2010/1092069 | 7/2010 | Toebes et al. |
| 2010/0235908 A1 | 9/2010 | Eynon et al. |
| 2010/0235909 A1 | 9/2010 | Eynon et al. |
| 2012/0174205 A1 | 7/2012 | Edmeades et al. |
| 2013/0212501 A1 | 8/2013 | Anderson et al. |
| 2014/0156401 A1* | 6/2014 | Carr .................... G06Q 30/02 705/14.53 |
| 2015/0164429 A1* | 6/2015 | Zhang ................ A61B 5/7235 600/521 |
| 2015/0310456 A1* | 10/2015 | Vandenburgh ......... G06Q 50/20 705/7.32 |

FOREIGN PATENT DOCUMENTS

| | | |
|---|---|---|
| CN | 102325062 | 1/2012 |
| CN | 102364468 | 2/2012 |
| CN | 102681787 | 9/2012 |
| CN | 102724182 | 10/2012 |
| CN | 102957570 | 3/2013 |
| CN | 103150374 | 6/2013 |
| FR | 2960323 | 11/2011 |
| GB | 2490910 | 11/2012 |
| JP | 2012014366 | 1/2012 |
| WO | WO2012/019643 | 2/2012 |

OTHER PUBLICATIONS

European Search Report for EP 15 17 3218 dated Nov. 13, 2015.

* cited by examiner

Sports/Football (156a, 158a)

|  | M | F |
|---|---|---|
| <18 | 0.20 | 0.05 |
| 18-25 | 0.20 | 0.10 |
| 26-40 | 0.20 | 0.07 |
| 41+ | 0.15 | 0.03 |

Sports/News (156b, 158b)

|  | M | F |
|---|---|---|
| <18 | 0.20 | 0.05 |
| 18-25 | 0.25 | 0.10 |
| 26-40 | 0.20 | 0.04 |
| 41+ | 0.15 | 0.01 |

Clothes/Fashion (156c, 158c)

|  | M | F |
|---|---|---|
| <18 | 0.02 | 0.30 |
| 18-25 | 0.01 | 0.30 |
| 26-40 | 0.01 | 0.20 |
| 41+ | 0.01 | 0.15 |

News/Politics (156d, 158d)

|  | M | F |
|---|---|---|
| <18 | 0.01 | 0.01 |
| 18-25 | 0.05 | 0.08 |
| 26-40 | 0.30 | 0.25 |
| 41+ | 0.20 | 0.10 |

Fig. 6C

DETERMINING MULTIPLE USERS OF A NETWORK ENABLED DEVICE

BACKGROUND OF THE INVENTION

1. Field

The present invention relates to usage of network devices. More particularly, the present invention relates to determining with confidence when a change of users occurs for a network enabled device.

2. The Relevant Technology

Network enabled devices are used to access a network and be involved in many network events, such as browsing web sites, participating in telephone calls, etc. It is often desirable for those in the network to know who is using the network enabled device, such as for marketing or other purposes. In many cases, however, the users of a device may periodically change. In conventional systems, this change of users is hard, if not impossible to detect. This is especially true in mobile devices, where the users of the mobile devices are often different than the registered owners. For example, the owner of a mobile device may simply allow somebody else to temporarily use the mobile device. Or the subscriber of a mobile service may permanently give his mobile device to another, e.g. to a son or other family member, upon termination of the owner's subscription. As another example, in a number of markets it is not uncommon for a mobile device to be shared within a home, family or village. In all of these situations, the user of the mobile device can be different than the registered owner of the mobile device. This can lead to various problems.

For example, M-Pesa is a mobile-phone based money transfer and microfinancing service that allows users with a national ID card or passport to deposit, withdraw, and transfer money easily with a mobile device. Users are charged a small regulated fee for sending and withdrawing money using the service. The M-Pesa service is provided by agents who must be registered. Each agent provides the service by allowing people to use the agent's mobile device to perform the transactions.

However, a significant problem has arisen in the implementation of M-Pesa. There are many people who now provide the service without being registered. Many problems have arisen because of this, such as the unregistered provider applying disproportionate fees to the users, and fraud is being committed by the unregistered providers. Unfortunately, today's analyticals cannot distinguish between a registered owner of a mobile device and a separate user of the device. Because of this, unregistered providers are extremely difficult, if not impossible to detect.

Other problems are also caused by the indistinguishability of today's analyticals between owners and users of mobile devices.

BRIEF SUMMARY OF THE INVENTION

Embodiments of the present invention relate to determining with confidence when a change of users occurs for a network enabled device.

A first aspect provides for a method of predicting a change of users of a network enabled device. A present device category and a present device demographic profile are associated with the network enabled device. The present device category is one of a plurality of predefined categories corresponding to groups of similar network events. Each predefined category has a demographic profile associated therewith. The method includes detecting a network event corresponding to the network enabled device, determining an event category corresponding to the detected network event, the event category being one of the plurality of predefined categories; and comparing the event category with the present device category. The method further includes, when the event category differs from the present device category, determining a new demographic profile based on the present device demographic profile and the demographic profile associated with the event category; and comparing the new demographic profile with the present device demographic profile. The method further includes, when the new demographic profile differs from the present device demographic profile, setting forth an alert predicting a change of users of the network enabled device.

A second aspect provides for a method of predicting a change of users of a network enabled device. A present device category and a present device matrix respectively correspond to a category and demographic profile associated with the network enabled device. The present category is one of a plurality of predefined categories corresponding to groups of similar network events. Each predefined category has a demographic profile associated therewith. The present device matrix has a present segment leader. The method includes: detecting a network event corresponding to the network enabled device; determining an event category corresponding to the detected network event, the event category being one of the plurality of predefined categories; and comparing the event category with the present device category. The method further includes, when the event category differs from the present device category, calculating a new relative matrix based on the present device matrix and the demographic profile associated with the event category; determining a new segment leader corresponding to the new relative matrix; determining an increase of value of the new segment leader; and comparing the new segment leader to the present segment leader and the increase of value of the new segment leader to a predetermined threshold value. The method further includes, when the new segment leader differs from the present segment leader and the increase of value is greater than the predetermined threshold value, setting forth an alert predicting a change of users of the network enabled device.

A third aspect provides for a method of monitoring for a change of users of a network enabled device. A present device category and a present device matrix respectively correspond to a running category and running demographic profile associated with the network enabled device. A predetermined threshold is also associated with the network enabled device. The present category is any one of a plurality of predefined categories corresponding to groups of similar network events. Each predefined category has a demographic profile associated therewith. The present device matrix has a present segment leader. The method includes: continuously performing a method: detecting a network event corresponding to the network enabled device; determining an event category corresponding to the detected network event, the event category being one of the plurality of predefined categories; and comparing the event category with the present device category and when the event category differs from the present device category, calculating a new relative matrix based on the present device matrix and the demographic profile associated with the event category; determining a new segment leader corresponding to the new relative matrix; determining an increase of value of the new segment leader; and comparing the new segment leader to the present segment leader and the increase of value of the new segment leader to a predetermined threshold value, and when the new segment leader differs from the present segment leader and the increase of value is greater than the predetermined threshold value, setting forth an alert predicting a change of users of the A network enabled device; and updating the present device category and the present matrix to respectively equal the event category and the new relative matrix.

A fourth aspect provides for a network device configured to monitor a plurality of communication devices over a network, the network device including a processor and a memory. The memory has stored thereon a plurality of demographic profiles, each corresponding to one of a plurality of predefined categories corresponding to groups of similar network events. The memory also has stored thereon, for each communication device, a present device category selected from one of the plurality of predefined categories based on recent network events corresponding to the communication device, and a present device demographic profile based at least in part on the present device category A fifth aspect provides for a system having a communication network and a plurality of communication devices that communicate with the communication network. The communication network has stored thereon a plurality of demographic profiles, each corresponding to one of a plurality of predefined categories corresponding to groups of similar network events. The communication network maintains, for each communication device, a present device category selected from one of the plurality of predefined categories based on recent network events corresponding to the communication device, and a present device demographic profile based at least in part on the present device category The foregoing summary is illustrative only and is not intended to be in any way limiting; the summary is provided to introduce a selection of concepts in a simplified form that are further described below in the Detailed Description. The summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

Various embodiments will now be discussed with reference to the appended drawings. It should be appreciated that these drawings depict only typical embodiments of the invention and are therefore not to be considered limiting of its scope. It should also be appreciated that the drawings are not necessarily drawn to scale and that some of the elements may be drawn merely for clarity of the invention.

In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") when referring to a specific instance of the element.

FIGS. 6A-6C illustrate exemplary demographic profile format, system, and category profiles used in discussing various Examples using embodiments of the present invention.

DETAILED DESCRIPTION

As used in the specification, a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Furthermore, as used in the specification and appended claims, directional terms, such as "top," "bottom," "left," "right," "up," "down," "upper," "lower," "proximal," "distal" and the like are used herein solely to indicate relative directions and are not otherwise intended to limit the scope of the invention or claims.

Figure 1:
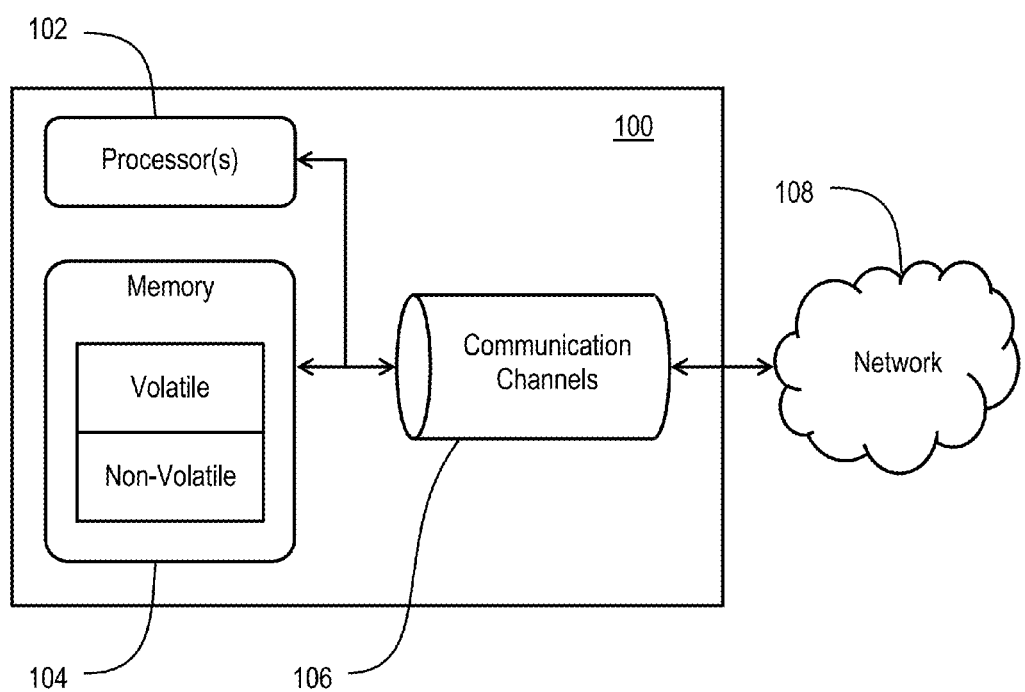
FIG. 1 illustrates a computing system that can incorporate features of the present invention.

Embodiments of the present invention disclosed or envisioned herein may comprise or utilize a special purpose or general-purpose computer including computer hardware, such as, for example, one or more processors and system memory. For example, FIG. 1 illustrates an exemplary computing system 100. As illustrated in FIG. 1, in its most basic configuration, computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system 100 is distributed, the processing, memory and/or storage capability may be distributed as well. As used herein, the term "module" or "component" can refer to software objects or routines that execute on the computing system 100. The different components, modules, engines, and services described herein may be implemented as objects or processes that execute on the computing system 100 (e.g., as separate threads).

In the description that follows, embodiments are described with reference to acts that are performed by one or more computing systems, such as the computing system 100. If such acts are implemented in software, one or more processors of the associated computing system that performs the acts direct the operation of the computing system in response to having executed computer-executable instructions. An example of such an operation involves the manipulation of data. Within the context of the computing system 100, computer-executable instructions (and the manipulated data) may be stored in the memory 104. Computing system 100 may also contain communication channels 106 that allow the computing system 100 to communicate with other message processors over, for example, network 108.

Embodiments may also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes recordable-type storage media, such as RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmission media can include a network (e.g., network 108) and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a Network Interface Controller (NIC)), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which when executed by a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described herein. Rather, the described features and acts described herein are disclosed as example forms of implementing the claims.

Those skilled in the art will appreciate that embodiments of the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile devices, PDAs, pagers, routers, switches, and the like. Embodiments of the invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entity's data center or "in the cloud."

Figure 2:
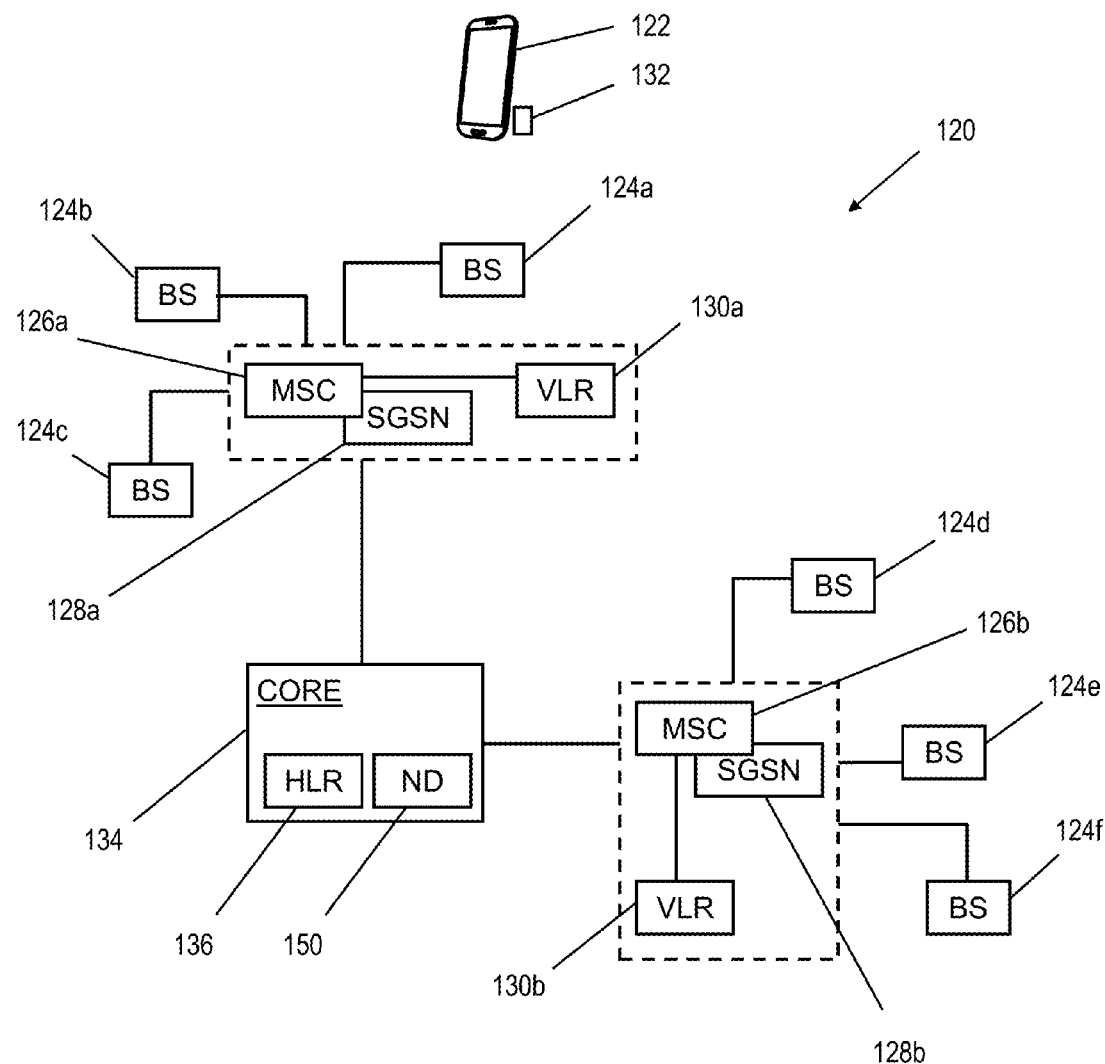
FIG. 2 illustrates a mobile network incorporating features of the present invention.

FIG. 2 illustrates an exemplary mobile or cellular communication network 120 incorporating features of the present invention. It should be understood that communication network 120 is exemplary only; other types of communication networks can be used in conjunction with or alternate to communication network 120. For example, a WiFi network can be used with mobile communication network 120, as is known in the art. Furthermore, future networks are also envisioned by the present invention. Certain elements of exemplary mobile network 120 and its operation will now briefly be described.

The term "base station" refers hereafter to: a base transmission station (BTS) in the 2G GSM standards; a "node B" in the 3G UMTS® standards; an "eNode B" in the 4G LTE standard; and any network entity that performs analogous functions to the preceding entities. Each base station corresponds to a respective cell of its cellular or mobile telecommunications network and receives calls from and transmits calls to a mobile device in that cell by wireless radio communication in one or both of the circuit switched or packet switched domains. Such a subscriber's mobile device is shown at 122. The mobile device may be a handheld mobile telephone, a tablet, or other like device.

The mobile telecommunications network uses base station subsystems (BSs) 124 (124a-124f) to communicate with the mobile devices. In a 2G mobile telecommunications network, such as GSM, each BS 124 comprises at least one BTS and a base station controller (BSC). The BSC typically controls more than one BTS. The BTSs and BSCs together comprise the 2G radio access network (RAN).

In a 3G mobile telecommunications network, such as UMTS®, each BS 124 comprises at least one node B and a radio network controller (RNC). An RNC may control more than one node B. The node Bs and RNCs comprise the 3G RAN.

In the 4G LTE mobile telecommunications network, each BS 124 comprises an eNode B which combines certain functionalities of a 3G RNC and a Node B. The eNode Bs are arranged in groups and each group of eNode Bs is controlled by a Mobility Management Entity (MME) and a User Plane Entity (UPE). Other mobile network configurations are also possible.

The BSs 124 are arranged in groups and each group of BSs 124 is controlled by a mobile switching center (MSC) 126, such as MSC 126*a* for base stations 124*a*-124*c*. As shown in FIG. 2, the network has another MSC 126*b*, which is controlling a further three base stations 124*d*-124*f*. In practice, the network will likely incorporate many more MSCs 126 and BSs 124 than are shown in FIG. 2. Each BS 126 has a dedicated connection to its respective MSC 126—typically a cable connection.

MSCs 126 support communications in the circuit switched domain—typically voice calls. Corresponding serving GPRS support nodes (SGSNs) 128 (128*a*-128*b*) are provided to support communications in the packet switched domain—such as general packet radio service (GPRS) data transmissions. SGSNs 128 function in an analogous way to MSCs 126. SGSNs 128 are equipped with an equivalent to the visitor location registers (VLRs) 130 (130*a*-130*b*) used in the packet switched domain.

Each subscriber to the network is provided with a smart card or subscriber identity module (SIM) 132 which, when associated with the user's mobile device 122 identifies the subscriber to the network. The SIM card 132 is pre-programmed with a unique identification number, the "International Mobile Subscriber Identity" (IMSI) that is not visible on the card and is not generally known to the subscriber. The subscriber is issued with a publicly known number, that is, the subscriber's telephone number, by means of which callers initiate calls to the subscriber. This number is the Mobile Subscriber ISDN (MSISDN).

The subscriber belongs to a core network 134 that includes information about the subscriber. MSCs 126 and SGSNs 128 communicate with the core network of the subscriber. Core network 134 includes a home location register (HLR) 136 which, for each subscriber to the network, stores the IMSI and the corresponding MSISDN together with other subscriber data, such as the current or last known MSC or SGSN of the subscriber's mobile device 124. Core network 134 can also include a network device (ND) 150 that can be used to store information regarding one or more of the mobile devices in the network and/or perform methods discussed or envisioned herein of determining a change of a user for one or more of the mobile devices.

When mobile device 122 is activated, it registers itself in the network by transmitting the IMSI (read from the associated SIM card 132 of mobile device 122) to the BS 124 associated with the particular cell in which device 122 is located. In a traditional network, the base station 124 then transmits this IMSI to the MSC 126 with which the base station 124 is registered.

MSC 126 accesses the appropriate storage location in HLR 136 present in core network 134 and extracts the corresponding subscriber MSISDN and other subscriber data from the appropriate storage location, and stores it temporarily in a storage location in visitor location register (VLR) 130 corresponding to the MSC. In this way, therefore the particular subscriber is effectively registered with a particular MSC 126, and the subscriber's information is temporarily stored in the corresponding VLR 130.

Many of the components of network 120 are used to keep track of subscribers and of resources being used. As a result, software applications are now available to determine network resources, e.g., websites, each subscriber uses. As a result, when demographic information of subscribers is known, a determination can be made over time of the types of subscribers that use each particular network resource. Based on this, a demographic profile can be determined corresponding to each particular network resource.

The demographics of mobile device subscribers are presently available in many areas. For example, in Europe and other areas demographic information of a subscriber is typically collected when a mobile device is purchased. That demographic information can be used to generate a demographic profile for each network resource. Presently, many companies have devices/applications that can determine the subscribers that access each site, which allows demographic information to be gathered over time. The devices/applications generally sit on the network and take action when a particular website is accessed. The device/application can identify network resources, such as web sites, accessed by particular customers, look at the demographics for each customer accessing each particular network resource and generate a demographic profile for each particular resource. Matching demographics to categories is then determined To make the information more manageable, different network resources having similar demographic profiles can be grouped into various categories. For example, broad categories for web sites might be "sports," "news," "entertainment," etc. Each broad category might also be broken down into specific categories, such as "soccer," "basketball," "hockey," and the like for "sports", and "politics," "world news," "local news," and the like for "news." Some categories may overlap so as to belong to more than one broad category. Of course, other categories are also possible. Presently, many companies provide information on categories of web sites, including which web sites belong to which categories and the demographic profiles of each category.

The above approach to determining network resource demographics can work well for networks in which the subscriber is the only user of a network communication device. However, as discussed above, the demographic information for a network enabled device, such as a mobile device, is generally obtained only at the time of purchase and only corresponds to the subscriber of the network service. It has been found that determining network resource demographics are at most only about 80% accurate, in large part because the user of the network enabled device is not always the subscriber corresponding to the network enabled device.

For example, the subscriber of a mobile device may simply allow somebody else to temporarily use the mobile device. Or the subscriber may permanently give the mobile device to another, e.g. to a son or other family member, upon termination of the subscriber's subscription. As another example, in a number of markets it is not uncommon for a mobile device to be shared within a home, family or village.

In those situations and others in which the user of a network enabled device is different than the subscriber to whom the network enabled device is registered, the user may belong to a different demographic than the subscriber. This can skew the results of today's analyticals because they are based only on the subscriber. That is, today's analytical applications cannot distinguish between registered owners and users of a network enabled device, such as a mobile device, and are therefore using incorrect demographics when the user of the network enabled device is not the subscriber. Profiles built for marketing and advertising to users of mobile devices, for example, can produce false results, and budgets/costs can be wasted if the profiles are based solely on the registered owners.

Detecting when a network device is being used by different people can be useful in many areas. By way of example, the following uses can benefit from such a detection:

A profile of activity for the device can be built with respect to the user instead of the registered owner, knowing that not all detected behaviors belong to the SIM/Device owner.

Services/advertisements can be tailored to the device user instead of the registered owner. This can protect users who are minors from receiving undesirable content In M-PESA a detection of many users can serve as a strong indicator of an unregistered provider providing service illegally to the public.

A detection of a new user can be used to determine if and when a mobile device has been stolen.

Screen layout and terminology can be tailored to the device user. For example, screen buttons can be larger for elderly users and menu options can be simplified for younger users.

Embodiments of the present invention can provide many unique benefits not found in conventional devices or methods. One unique aspect is the ability to take into account historical usage of the network enabled device without having to save or store information corresponding to each past usage. In many embodiments, a category and a running score or profile corresponding to the device can be used and updated as new information is received. As such, the category and running profile, which are often updated, are the only information required to be saved corresponding to the network enabled device.

Another unique aspect is that information corresponding to different users of the network enabled device is not required to be used or saved. Many embodiments of the present invention simply keep track of the usage of the network enabled device as a whole. That is, a change of users of the network enabled device can be predicted based solely on overall usage of the network enabled device, without determining or saving information corresponding to each particular user. As such, a prediction can be made regarding a change of users without tracking individual users.

Another unique aspect of is that the methods and information required to predict a change of users of a network enabled device can be performed and stored on the network side. As a result, no applications or data need to run or be stored on the network enabled device. Because of this, embodiments of the present invention can be incorporated into present networks without requiring any changes to be made to the network enabled devices presently using the networks.

Various methods are presented herein for predicting or otherwise detecting when a change of user occurs in a network enabled device. These methods can be performed on the network side, e.g., on core network 134 or any other portion of network 120. As discussed above, by doing this no changes are required to be made to the network enabled device. Furthermore, many, if not all, of the methods can be performed for each of a plurality of network enabled devices on the network and, if desired, can be performed for all of the devices using a same network device.

A system according to one embodiment for predicting or otherwise detecting when a change of user occurs in a network enabled device can include a communication network and a plurality of communication devices that communicate with the network. The communication network can have stored thereon a plurality of predefined categories corresponding to groups of similar network events and a demographic profile corresponding to each predefined category. The network can maintain, for each of the communication devices, a present device category selected from one of the plurality of predefined user categories based on recent network events corresponding to the communication device. The network can also maintain, for each of the communication devices, a present device demographic profile based at least in part on the present device category.

For ease of discussion, many examples of the methods will be discussed with respect to a mobile network, e.g. network 120, as the network and one or more communication devices, e.g. mobile device 122, as the network enabled devices. However, as discussed above it should be understood that the methods can be used with other types of wired and wireless networks, communication systems, and the like.

Figure 3:
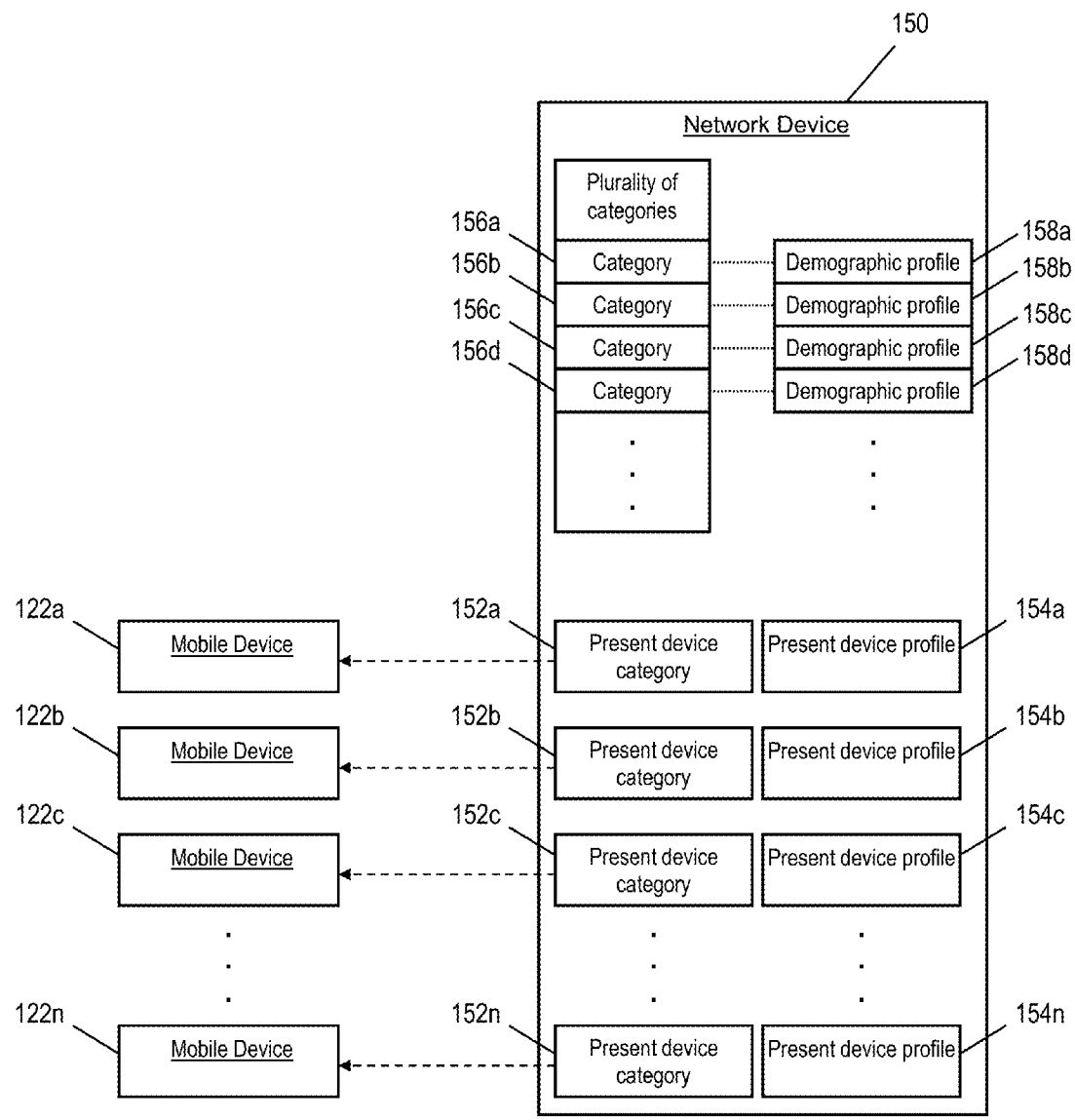
FIG. 3 depicts an embodiment of a network device used to store, monitor, and maintain user demographic information relating to each of a plurality of mobile devices.

FIG. 3 depicts an embodiment in which network device 150 is used to store, monitor, and maintain relevant information relating to each of the plurality of mobile devices 122 (122a-122n). As shown in FIG. 2, network device 150 can be located in core network 134. Alternatively, network device can be located on any other location in network 120. Furthermore, network device 150 can be a standalone unit or can be combined with one or more other common network devices.

A plurality of predefined categories 156 (156a-156d) is used corresponding to groups of similar network event information, as discussed above. Each of the predefined categories includes its own demographic profile 158 (158a-158d) based on information gathered previously, as discussed above. As shown in FIG. 3, the demographic profiles 158 corresponding to the predefined categories 156 can be stored on network device 150 for easy access, such as in a database or the like. Alternatively, the demographic profiles 158 and/or corresponding predefined categories 156 can be stored on any other portion of network 120.

As shown in FIG. 3, each mobile device 122 has a present device category 152 (152a-152n) and a present device profile 154 (154a-154n) associated therewith that are stored on network device 150. The present device category 152 and present device profile 154 associated with any particular mobile device 122 respectively correspond to a present usage of the mobile device.

The present device category 152 is the category presently associated with the mobile device 122. It corresponds to the last network event associated with the mobile device. The present device category 152 corresponds to one of the plurality of predefined categories 156. The present device categories 152 are independent from each other. As such, the present device category for more than one mobile device 122 can reflect the same predefined category 156.

The present device profile 154 is a running profile or score of the mobile device that reflects the likely demographics of the device based on the network usage of the device. The present device profile 154 is based on demographics corresponding to the present device category 152 as well as past categories associated with the mobile device 122, as discussed below. By using a running device profile, no past profiles need to be stored. That is, for each mobile device 122, the present device category and present device profile are all that need to be stored for continuing use.

Network device 150 can use any manner known in the art to keep track of the information for each mobile device 122. For example, one or more databases as is known in the art can be used by network device 150 to store, monitor, and maintain the present device category and present device profile for each mobile device.

Network device 150 can "sit" on the system and tap into the network to monitor individual mobile devices 122 to determine web sites, such as urls/etc., the user is visiting, and correlate the visited web sites to corresponding categories. Alternatively, network device 150 can obtain some or all of the required information corresponding to each mobile device 122 from other monitoring devices. For example, if a mobile device 122 connects to an external WiFi network, the information corresponding to that mobile device 122 may be obtainable from monitoring devices or log files maintained by the WiFi network. The same may also be possible when using a fixed line network. When a change in categories occurs for a mobile device 122, such as, e.g., sports to shopping, demographics typically associated with the new category can be compared to the present device profile to determine if it is likely that the user has changed.

Figure 4:
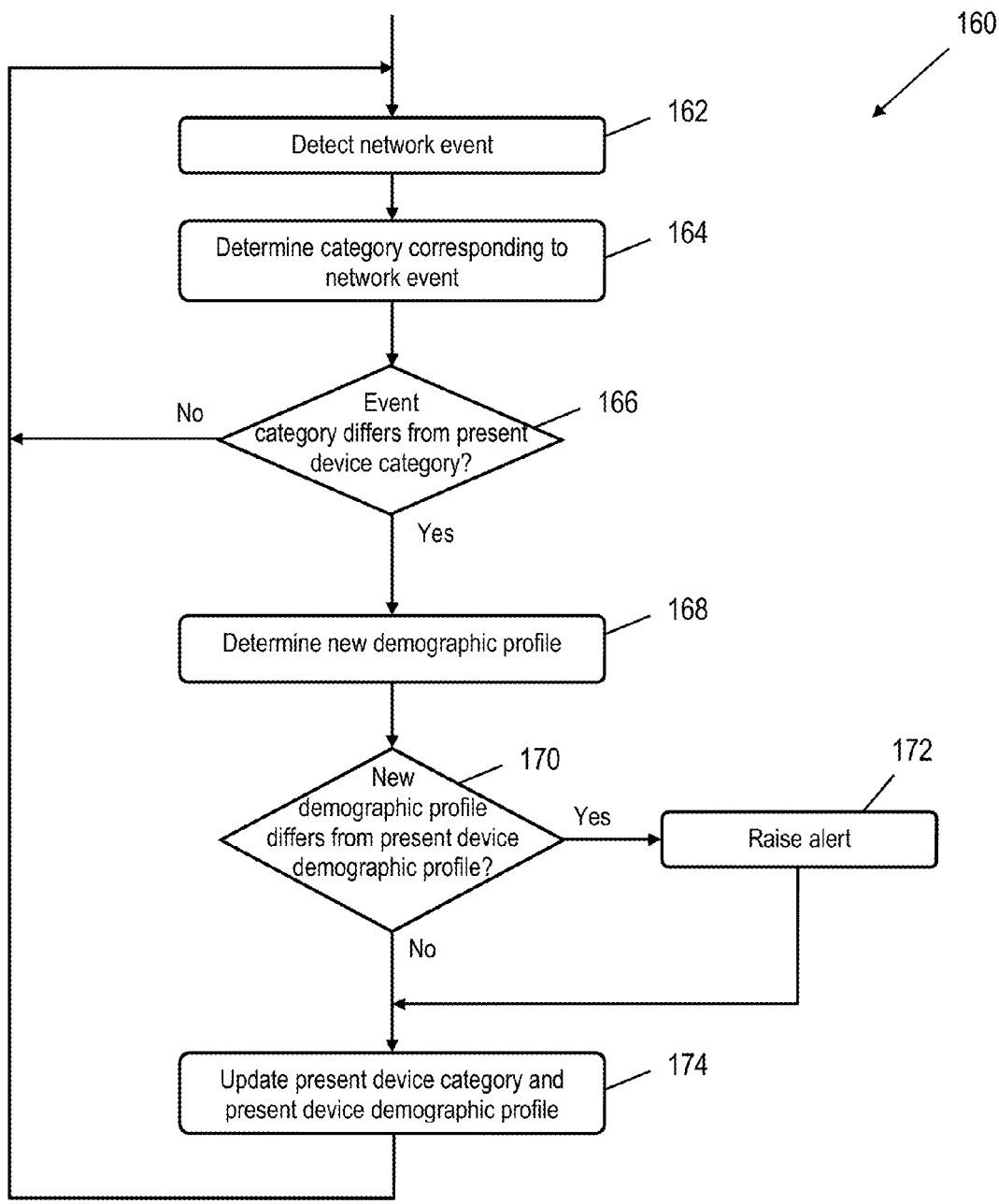
FIG. 4 illustrates a method of predicting when a change of users occurs in a network enabled device and raising an alert accordingly, according to one embodiment.

For example, FIG. 4 shows a method 160 of predicting a change of users of a network enabled device, such as mobile device 122, according to one embodiment. The method can be performed periodically or as a continuous loop, if desired. Furthermore, although the method is directed to a single network enabled device, it should be appreciated that the method can be performed concurrently for multiple network enabled devices in the system. The method can be performed by network device 150 or by any other portion of the network.

Before method 160 is performed, a present device category and a present device demographic profile are first determined corresponding to the network enabled device. If no latest device category and/or device demographic profile has yet been associated with the network enabled device, they can respectively be equated to the first category associated with the network enabled device and the demographic profile corresponding to the first category.

In step 162, network event information is monitored and analyzed to determine when a network event occurs corresponding to the network enabled device. In one a network device or a software application thereon collects network traffic information corresponding to the network enabled device and analyzes the collected information to determine when the network event occurs. For example, network device 150 can monitor communication to and from mobile device 122. A network event can correspond to changes in network usage by the network enabled device, among other things. By way of example and not limitation, a network event can correspond to viewing of a new web site, obtaining content from a web site or other network location, or performing a financial transaction. In those cases, network event information can include information regarding the visited web site (e.g. URL or the like), the content obtained from the web site or other network location, or the financial transaction conducted using the network enabled device. A network event can also correspond to a change in the physical location of the network enabled device. In that case, network event information can include geophysical location of the network enabled device, e.g., a GPS location or a cell tower being presently used by mobile device 122. Alternatively, physical location can be one of the demographic attributes included in the demographic profiles. Either way, the physical location of the network enabled device can be another variable to help determine when a change of users has occurred. The network event information can be collected in real time or near real time, or there can be a delay in the collecting of the information. When a network event is detected, the method proceeds to step 164.

In step 164, a category is determined for the network event. Determining the event category can include correlating the changed user activity to one of the predefined categories. Correlating a network event, such as a web site visit, to a corresponding category can be accomplished using data from third party applications or can be done internally.

In step 166, the event category is compared to the present device category. If there is no difference between the two, the method returns to step 162 to monitor for the next network event. In this manner, the method can be performed in a continuous loop, if desired. On the other hand, if there is a difference between the event category and the present device category, the method proceeds to step 168. As such, steps 162, 164, and 166 can repeat until the category of a detected network event becomes different from the present device category.

In step 168, a new demographic profile is determined. The new demographic profile is based on the present device demographic profile and the demographic profile associated with the event category. In one embodiment, the new demographic profile is equal to the present device demographic profile, modified by the demographic profile associated with the category corresponding to the network event, as discussed in more detail below.

In step 170, the new demographic profile is compared to the present device demographic profile. If no difference exists between the two, it is unlikely that the user has recently changed and the method proceeds to step 174. If there is a difference, however, the likelihood is high that the user has recently changed. In that situation, the method performs step 172 before proceeding to step 174. In one embodiment, segments of the new demographic profile and/or the present device demographic profile are compared to determine if a difference exists, as discussed in more detail below.

In step 172, an alert is raised based on our prediction that a change of users has occurred for the network enabled device. The alert can comprise executing an application, transmitting a message to another network device, or any other type of action. The alert can include the most likely new demographic of the user of the device. The alert generally makes known that a change of user has likely occurred so action can be taken. The alert can be used as a trigger for various acts. For example, the alert can be used to:

Maintain a dynamic advertising profile for the device, so that, for example, future requests from ad-servers receive the new device demographics and not those of the registered owner. This allows for relevant advertising based on the current user of the device instead of on the registered owner.

Protect minors from offensive content (e.g., by using a dynamic age filter) by maintaining an accurate age-based device profile.

Detect if and when a device is loaned or used by others (e.g., a corporate device). This can be effective for areas in which it is forbidden to do so, such as under M-PESA.

Detect if and when a device is stolen based on significant device demographic changes.

Once the alert is raised, the method proceeds to step 174.

In step 174, the present device category and present device demographic profile of the network enabled device are updated. In one embodiment, this is accomplished by replacing the value of the present device category with the value of the event category and by replacing the value(s) of the present device demographic profile with the value(s) of the new demographic profile. In this way, the present device category can continuously represent the present category of the device and the present device demographic profile can represent a running profile of the network enabled device that takes into account prior history of the device. If desired, once the present device category and present device demographic profile have been updated, all other values can be discarded. Once the present values corresponding to the network enabled device have been updated and saved, the method returns to step 162 to monitor for the next network event. As such, method 160 can be performed on a continuous basis, if desired.

To determine the running profile corresponding to the network enabled device, a software engine has been invented that takes into account past usage of the device to determine a "most likely" demographic profile for the device, which is then used to determine the probability that there has been a change of users, as discussed below. A confidence factor is used to provide a threshold confidence level of the user change and can help to prevent false predictions of user changes. The algorithm takes into account the near past to determine if a category shift is a short term change or a long term change. When the shift is a long term change, it is more likely that there is a new user.

The software engine can rely on the capture of events from one or more sources, such as telephone calls, SMS communications, data-usage events including HTTP/FTP, target URLs, and off-network events. To aid in determining the network enabled device, the events can contain a source identifier (e.g., IMSI, MSISDN, or IMEI) so they can be correlated back to an original customer profile, and, if desired, a location (this may be inferred if not available using an external algorithm/patent).

To understand the method, we will first present the algorithm used to estimate the change in users of a device. We denote $P_{E_i}(x_1, \ldots, x_n)$ to be a joint probability distribution function that indicates the probabilities that a user falls into specific demographic segments for event $E_i$. $x_1, \ldots, x_n$ are user demographic attributes that define different demographic segments of users. These demographic segments can be based on the category corresponding to event $E_i$. For example, $x_1$ can be the age of the user and $x_2$ can be the gender of the user. Of course, other segments can also be used. In one example, using $x_1$ as an age segment and $x_2$ as a gender segment, we can use the following linking of variable values with real segments corresponding to the variable as follows:

$x_1=0$ corresponds to "age of the user is <18 years old";
$x_1=1$ corresponds to "age of the user is between 18 and 25 years old";
$x_1=2$ corresponds to "age of the user is between 26 and 40 years old"; and
$x_1=3$ corresponds to "age of the user is more than 40 years old".

and
$x_2=0$ corresponds to "user is female"; and
$x_2=1$ corresponds to "user is a male".

These demographic segments can be considered as a matrix of n dimensions. For example, the above example can be considered a two-dimensional matrix with $x_1$ and $x_2$ corresponding to the two dimensions. The matrix structure is represented in Table 1, below.

TABLE 1

Matrix Structure

|         | $x_2 = 0$ | $x_2 = 1$ |
|---------|-----------|-----------|
| $x_1 = 0$ | $S_{00}$  | $S_{10}$  |
| $x_1 = 1$ | $S_{01}$  | $S_{11}$  |
| $x_1 = 2$ | $S_{02}$  | $S_{12}$  |
| $x_1 = 3$ | $S_{03}$  | $S_{13}$  |

As shown in Table 1, $S_{00}$ to $S_{13}$ are specific segments that each include a probability that a user corresponds to the associated demographic attributes represented by the specific values of $x_1$ and $x_2$. For example, $S_{00}$ corresponds to a female user who is less than 18 years of age and $S_{12}$ corresponds to a male user who is between 26 and 40 years of age First, consider the case when a user segment remains the same after observing m consecutive independent events. Let us denote Equation (1):

$$S = \{(x_1 = i_1, \ldots, x_n = i_n)\},$$

where S represents a user segment corresponding to specific values of demographic variables $x_1, \ldots x_n$, such as segments $S_{00}$ to $S_{31}$ in the example above.

Let us also denote $$E = \bigcap_{j=1}^{m} E_j,$$ Equation (2)

where E represents a set of m independent events $E_j$ having commonality.

We can calculate an absolute probability P of the same user belonging to a specific user segment S accessing/using the sequence of m independent events $E_j$.

$$P_E(S) = \prod_{j=1}^{m} P_{E_j}(x_1 = i_1, \ldots, x_n = i_n)$$ Equation (3)

We can then calculate a relative probability $P^r$ for each user segment S. First, we denote D to be the sum of all of the absolute probabilities for all of the user segments.

$$D_E = \sum_{over\_all\_i_1\_i_n} P_E(S)$$ Equation (4)

The relative probability score $P^r$ for each user segment S with respect to the other user segments is equal to the absolute probability P of the user segment S divided by the sum of all of the probabilities D.

$$P_E^r(S) = \frac{P_E(S)}{D_E}$$ Equation (5)

With the relative probability score calculated for each user segment S, a highest probability score can be determined. Equation (6):

$$P_{max} = \max_{over\_i_1 i_n} P_E^r(S),$$

In other words, the highest probability score $P_{max}$ is the highest relative probability score $P^r$ corresponding to the segment. And because the probability score P represents the likelihood of a user segment S, the most likely user segment S is the user segment S corresponding to the highest probability score $P_{max}$. As such, we will estimate that the present user segment $S_p$ after m independent events is the user segment S corresponding to the highest probability score $P_{max}$. And since the user is likely to fall within the present user segment $S_p$, we will also estimate that a change of users occurs when there is a change in the present user segment $S_p$.

Based on the above, a method of identifying a change of users of the device segment change can be performed in real time while observing in independent events on a device. An estimate can be made that the segment (and therefore the user) of the device has changed at the moment of time corresponding to the m-th event on the device if both of the following are true:

1) After m−1 independent events, $P_{max}$ corresponds to user segment $S_1$; and
2) After in independent events, $P_{max}$ corresponds to user segment $S_2$ different from $S_1$.

However, if $P_{max}$ in condition 1) does not differ much from $P_{max}$ in condition 2), the confidence level that the segment/user has changed is not high. This does not necessarily mean that the user has not changed. It may simply be that more data is required to increase the confidence level.

To increase the confidence level of a segment/user change of the device at the moment of time corresponding to the m-th event we can add another condition relating to the relative probabilities of user segment $S_1$ and/or $S_2$. For example one or more of the following can be added to conditions 1) and 2) above:

3a) The difference between $P_E^r$. $(S_2)$ calculated after in events and $P_E^r$. $(S_2)$ calculated after m−1 events, is greater than a constant threshold $C_1$ (for example $C_1$−0.15); or 3b) The ratio of $P_E^r(S_2)$ calculated after in events, to $P_E^r(S_2)$ calculated after m−1 events is greater than a predetermined threshold $C_2$ (for example $C_2$=3); or 3c) The ratio of $P_E^r(S_2)$ to $P_E^r(S_1)$, both calculated after observing in events, is greater than a pre-determined threshold $C_3$ (for example $C_3$=2):

$$\frac{P_E^r(S_2)}{P_E^r(S_1)} > C_3.$$

Because of the required thresholds, conditions 3a)-3c) are only satisfied when a significant change occurs to the relative probability scores of the segments. This typically occurs when the probability score changes and remains changed over a number of events. Because the probability scores typically only change when there is a change of category, conditions 3a)-3c) are only satisfied when the device has remained with a new category for a number of events, based on the threshold. As such, the confidence level is higher because recent history of the device is taken into account by the third condition. As such, satisfaction of condition 3a) or 3b) or 3c) along with conditions 1) and 2) provide a high degree of confidence that the segment/user has actually been changed on the m-th event.

The above algorithm assumes that events observed on the device are independent. If the events are not independent, the above algorithm can be modified, if desired, by considering/introducing (and accessing from known empirical/third-party data) conditional probability distribution functions such as:

$$P_{E_{i+1}|E_i(S)}$$

which can provide probability that the same user corresponding to the specific user segment S actually accessed/used observed event $E_{i+1}$ given that the previous event accessed/used on the device by the same user was event $E_i$ (and given that the next event observed was $E_{i+1}$).

As discussed above, the algorithm can be used in real time to detect when a change of users is probable. In addition, data from the algorithm can be used over time to determine trends and/or changes of usage of the device. The algorithm provides many benefits over conventional systems. For example, by using the algorithm the following benefits can be obtained:

More accurate network demographic usage can be obtained;
Smart advertising/dynamic profiles can be determined for relevant advertising;
Dynamic shaping of actual traffic or pre-caching content can be obtained based on the actual user;
Handset sharing can be detected;
Crime or stolen devices can be detected based on drastic changes in demographic profile of device; and
Marketing campaigns can be directed to the correct demographic of the user.

Figure 5:
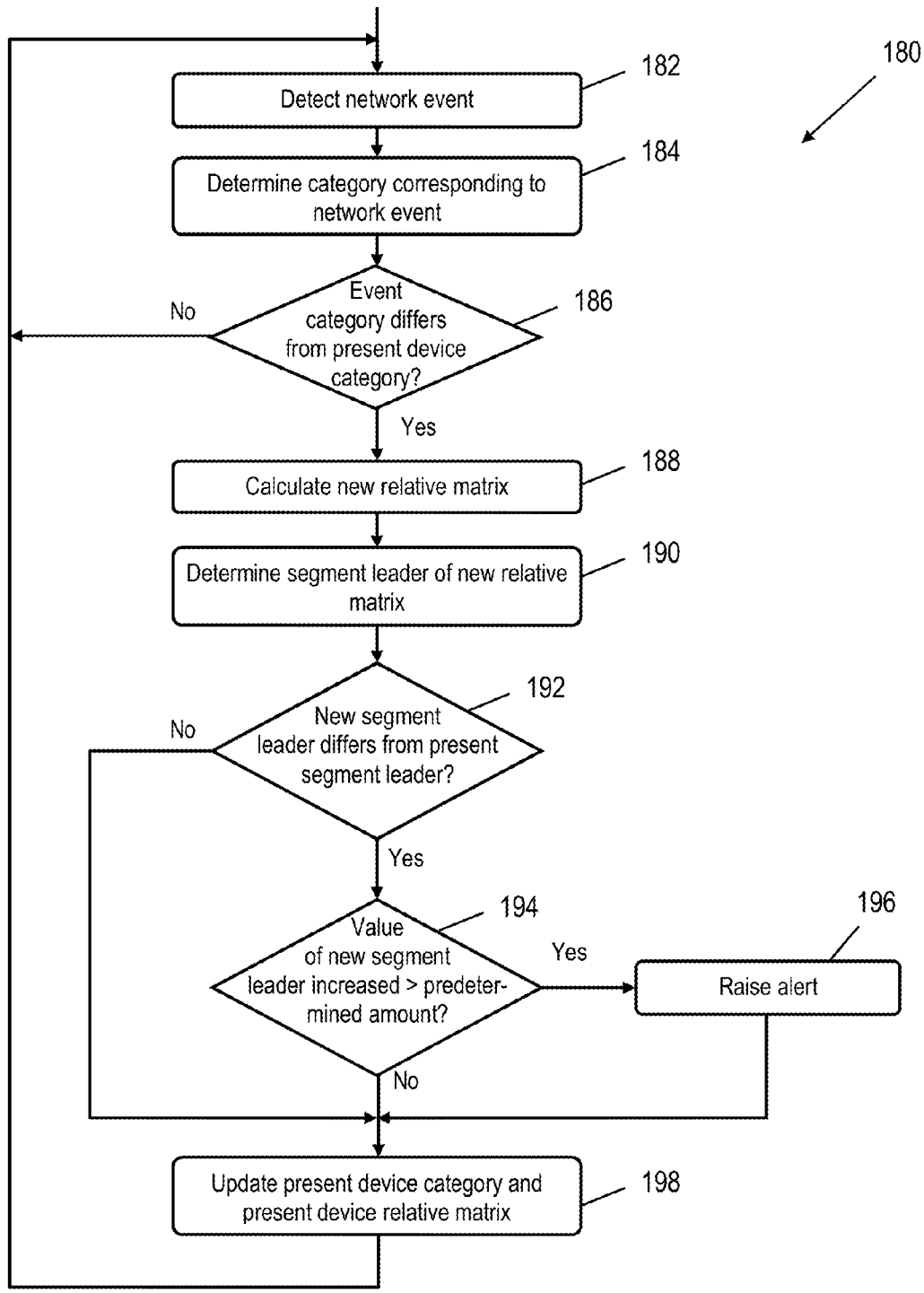
FIG. 5 illustrates a method of when a change of users occurs in a network enabled device and raising an alert accordingly, according to another embodiment.

FIG. 5 shows a method 180 of predicting a change of users of a network enabled device, such as mobile device 122 using the algorithm discussed above, according to one embodiment. Method 180 is similar to method 160 in many aspects. For example, similar to method 160, method 180 can be performed periodically and/or as a continuous loop, if desired. Furthermore, before method 180 is performed, a present device category and a present device demographic profile are first determined corresponding to the network enabled device. If no present device category and/or present device demographic profile have yet been associated with the network enabled device, they can respectively be equated to the first category associated with the network enabled device and the demographic profile corresponding to the first category.

For method 180, the present device demographic profile can be represented by a matrix of n dimensions, as discussed above, with each dimension representing a different demographic attribute. Each matrix cell corresponds to a specific demographic segment and includes a probability that a user corresponds to the specific values of the demographic attributes corresponding to the specific segment. In light of this, a present device matrix is used to represent the present device demographic profile in method 180. For ease of discussion, we will consider a two-dimensional matrix with age and gender corresponding to the two demographic attributes. However, other demographic attributes can alternatively be used. In addition, other matrix dimensions corresponding to various demographic attributes can be used; a matrix of any dimensional size can be used.

Steps 182, 184, and 186 of method 180 are similar to steps 162, 164, and 166 of method 160, discussed above. As such, the performance of steps 182, 184, and 186 can be determined by reviewing the discussion of steps 162, 164, and 166. In general, similar to method 160, method 180 can be performed periodically and/or remain in a continuous loop, steps 182, 184, and 186 being repeated until the event category becomes different from the present device category corresponding to the network enabled device. When a difference is determined, the method proceeds to step 188.

In step 188 a new relative matrix is calculated. This can be done in two sub-steps. First, the present device matrix can be multiplied by the demographic profile associated with the event category to yield a new preliminary matrix. Second, the new preliminary matrix can be normalized to obtain the new relative matrix. To do this, each of the specific segment entries of the new preliminary matrix can be divided by the sum of all of the specific segment entries of the new preliminary matrix. The resulting values correspond to the specific segment entries of the new relative matrix. It is appreciated that the sub-steps of step 188 can be combined, if desired. That is, both sub-steps can be performed concurrently, effectively bypassing the new preliminary matrix.

In step 190, the segment leader of the new relative matrix is determined. The segment leader is the specific segment that has the largest score (i.e., cell value) associated therewith. If more than one specific segment are tied with the largest score, then all of the tied specific segments are considered segment leaders.

In step 192, the segment leader of the new relative matrix, which we will refer to as "the new segment leader" is compared to the segment leader of the present device matrix, which we will refer to as "the present segment leader". If the new and present segment leaders are the same, it is unlikely that the demographic segment corresponding to the device has changed and therefore it is unlikely that the user of the device has changed. As such, the method proceeds to step 198. On the other hand, if the new and present segment leaders are not the same, it is likely that the demographic segment (and thus the user) corresponding to the device has changed. This corresponds to conditions 1) and 2) of the algorithm discussed above. If this is the case, the method proceeds to step 194.

As discussed above, even if the new segment leader is different than the present segment leader, it may not signify a real segment or user change; more confidence is desired. Step 194 is designed to provide the higher confidence. In step 194, the amount of increase in the value of the new segment leader is determined and compared with a predetermined threshold. This corresponds to condition 3a) of the algorithm discussed above. This step can be performed by determining the difference between the values in the new relative matrix and in the present device matrix of the new segment leader and comparing the difference with the predetermined threshold. If the difference is greater than the predetermined threshold, confidence is high that a change of segment (and user) has occurred and the method proceeds to step 196 to raise the alert. Otherwise, confidence is not high that a change of segment or user has taken place, and the method proceeds to step 198. The predetermined threshold can be any desired value. Generally, the higher the threshold value, the greater the confidence level that a segment (and user) change has taken place.

Step 194 can alternatively correspond to condition 3b) and/or condition 3c) of the algorithm discussed above. For example, instead of comparing the difference between the two values of the new segment leader, the ratio between the two relative scores can instead be compared, as in condition 3b). Or, the ratio of the values in the new relative matrix of the present and new segment leaders can be compared, as in condition 3c).

In step 196, an alert is raised predicting a change of users for the network enabled device, similar to step 172 of method 160, discussed above. Once the alert is raised, the method proceeds to step 198.

Steps 192 and 194 can be interchanged, if desired. That is, it can first be determined whether the increase of the value of the new segment leader is greater than the predetermined amount before it is determined whether the new segment leader differs from the present segment leader. Either way, the method will perform step 196 only if both conditions are true.

In step 198, the present device category and present device matrix are updated. In one embodiment, this is accomplished by replacing the value of the present device category with the value of the event category and by replacing the values of the present device matrix with the corresponding values of the new relative matrix. In this way, the present device category can continuously represent the present category of the device, as discussed above, and the present device matrix can represent the running demographic profile of the network enabled device that takes into account prior history of the device. If desired, once the present device category and matrix have been updated, all other values, such as the values in the new preliminary and relative matrixes can be discarded. Once the present values corresponding to the network enabled device have been updated and saved, the method can return to step 182 to monitor for the next network event.

A couple of examples will now be set forth to illustrate the methods discussed herein. The examples are based on internet websites visited by a browser on a network enabled device. For ease of discussion, the system will be set up as shown in FIG. 3 and the example will be performed on network device 150 with respect to one of the mobile devices 122.

Figures 6A, 6B:
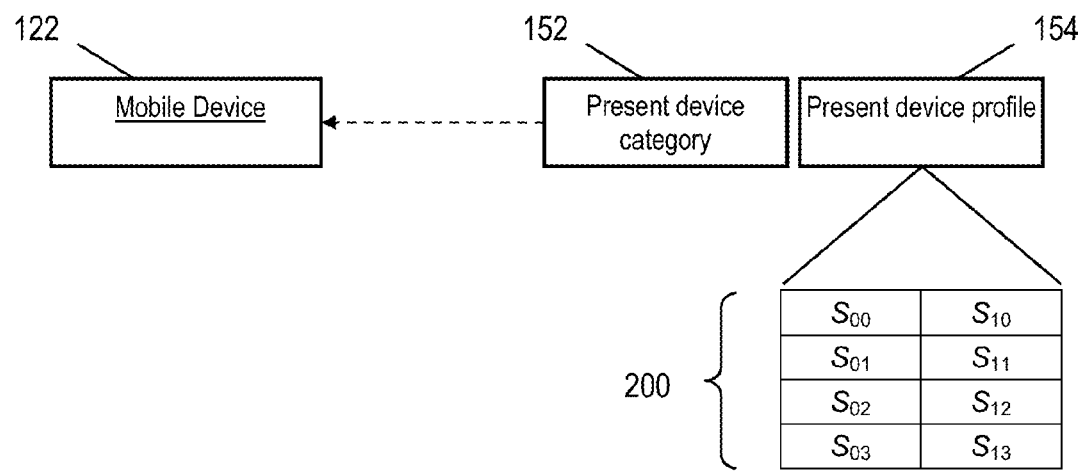

In the examples, network events are detected on URL changes. The events can contain a source identifier, such as, e.g., an IMSI, MSISDN, or IMEI number, so they can be correlated back to the original customer profile. In addition, a location of the network enabled device may be obtained corresponding to each corresponding network event. Each URL has been previously mapped to a particular category by a $3^{rd}$ party mapping company. For the purposes of the examples, each category 156 is mapped into a two-dimensional demographic profile 158 with the two dimensions corresponding to gender and age, as shown in FIG. 6A. As depicted, there are two possible values for gender (Male and Female), and four for age (<18, 18-25, 26-40, and 41+). As such, there are eight specific segments $S_{00}$-$S_{13}$ for each demographic profile 158 corresponding to the various combinations of gender and age. The value corresponding to each specific segment S indicates the probability that the user belongs to the particular demographic combination. For example, if the value of $S_{01}$ was 0.20, there would be a 20% probability that a visitor to a website corresponding to the particular category is an 18-25 year-old male.

The device profile 154 corresponding to the mobile device 122 is represented by a present device matrix 200 that is the same size as the demographic profiles associated with the categories, as shown in FIG. 6B. As such, present device matrix 200 also consists of a two-dimensional matrix having eight specific segments $S_{00}$-$S_{13}$ corresponding to the same various combinations of gender and age as the demographic profiles 158.

In the following examples we will use the four sample categories 156 (156a-156d) and their respective demographic profiles 158 (158a-158d) shown in FIG. 6C. The demographic values corresponding to the sample categories are for illustration purposes only and may not represent factual values. For simplicity purposes, the numeric values used in the following examples are show with at most four decimal places. It should be appreciated that as many decimal places can be used as are needed.

EXAMPLE 1

Figure 7A:
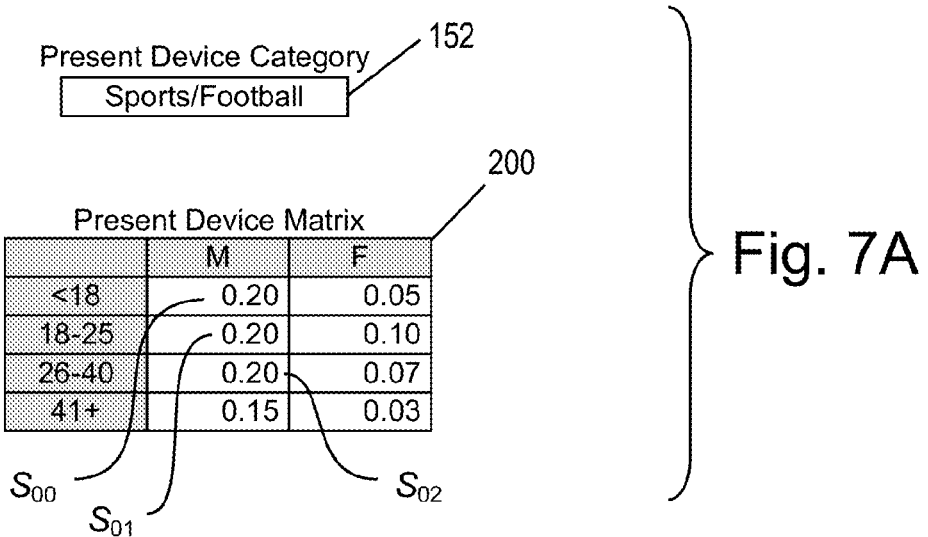
FIGS. 7A-7D illustrate various category and matrix values corresponding to a first example using an embodiment of the present invention.

In Example 1, method 180 is performed to predict when a change of users of mobile device 122 has occurred and raise an alert accordingly. For Example 1 we will use a predetermined threshold of 0.15. Steps 182, 184, and 186 are performed each time a new A website is visited by the browser until the category corresponding to the new website becomes different than the value of the present device category 152. Before the method is performed, the present device category 152 and present device matrix 200 are set up with initial values. In this example, a website corresponding to the Sports/Football category 156a is initially visited. This will be denoted Event 1 for this example. Because Event 1 is the initial event, present device category 152 and present device matrix 200 are given starting values corresponding to the Sports/Football category 156a, as shown in FIG. 7A. As can be seen, three of the specific segments ($S_{00}$, $S_{01}$, $S_{02}$) of present device matrix 200 have the highest probability value of 0.20 (i.e., 20%). As such, there is no clear segment leader for Event 1. However, because those three specific segments all correspond to the male gender, we can predict with confidence that the user is likely male, although we may not be able to predict the age.

Figure 7B:
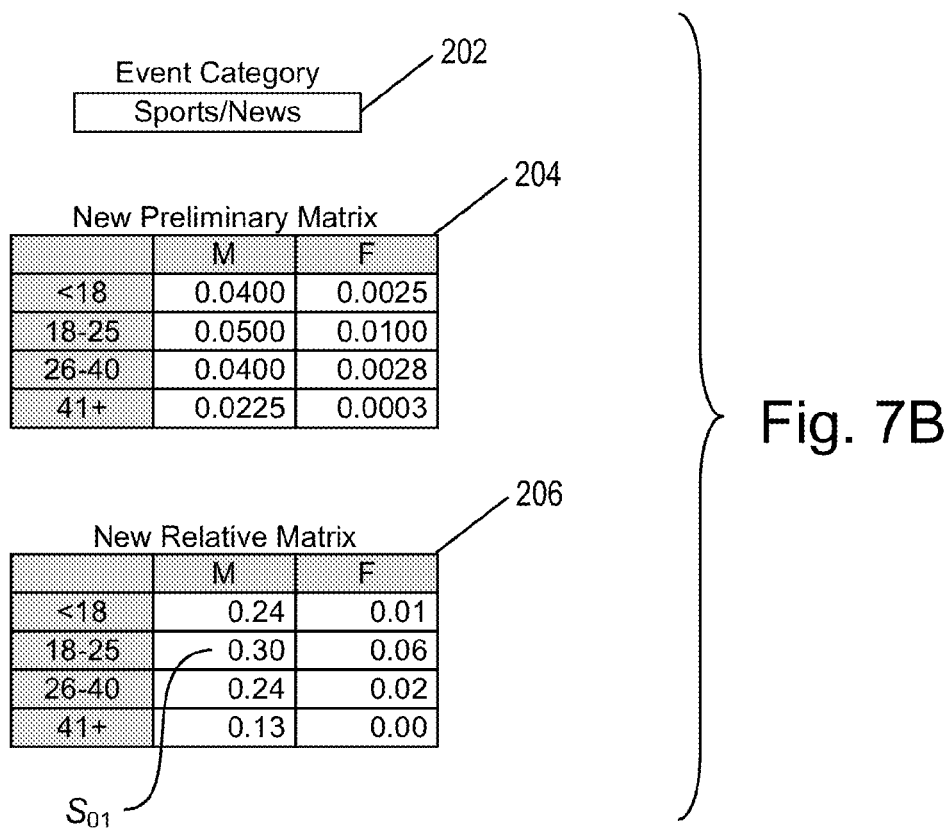

The next visited website corresponds to the Sports/News category 156b, and will be denoted Event 2. FIG. 7B shows the values that are generated as a result of Event 2. When Event 2 occurs, event category 202 is given a value corresponding to the Sports/News category. As such, the value of event category 202 ("Sports/News") becomes different than the value of present device category 152 ("Sports/Football"). As a result, step 188 is performed. New preliminary matrix 204 is generated by multiplying the values of the present device matrix 200 by the values of the demographic profile 158b corresponding to the Sports/News category. New preliminary matrix 204 is then normalized by dividing each entry therein by the sum of all of the values therein, which, in this example, is 0.1681. This results in new relative matrix 206.

Figure 7C:
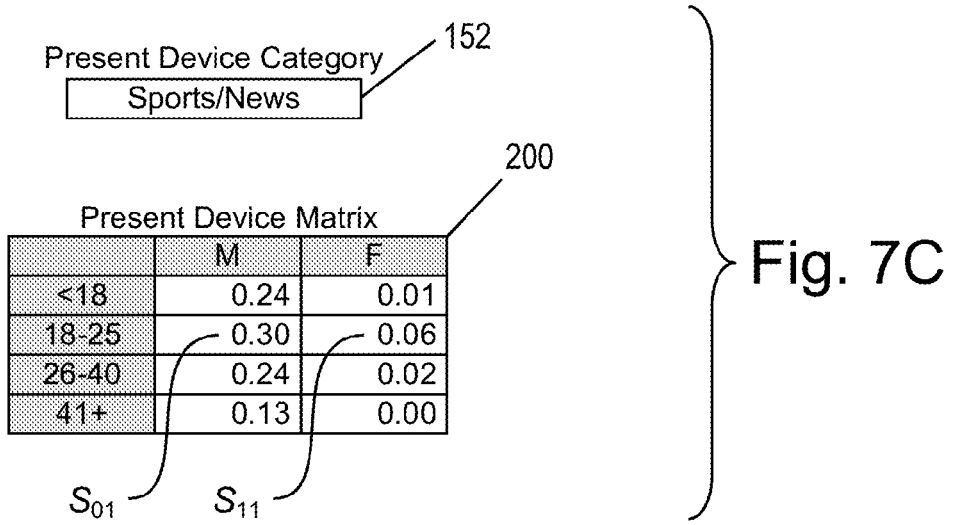

From new relative matrix 206, a new segment leader is determined. As shown in FIG. 7B, specific segment $S_{01}$ of new relative matrix 206 has the highest probability value of 0.30 (i.e., 30%) and is therefore the new segment leader. However, because the increase of specific segment $S_{01}$ is only 0.10, and because specific segment $S_{01}$ is one of the specific segments of present device matrix 200 that is the present segment leader, there is no clear new segment leader. Similar to Event 1, we can predict with confidence that the user is likely male, although we may not be able to predict the age. As such, no alert is raised and present device category 152 and present device matrix 200 are updated respectively with the values of event category 202 and new relative matrix 206, as reflected in FIG. 7C. The method returns to steps 182, 184, and 186 to detect when a new category occurs.

Figure 7D:
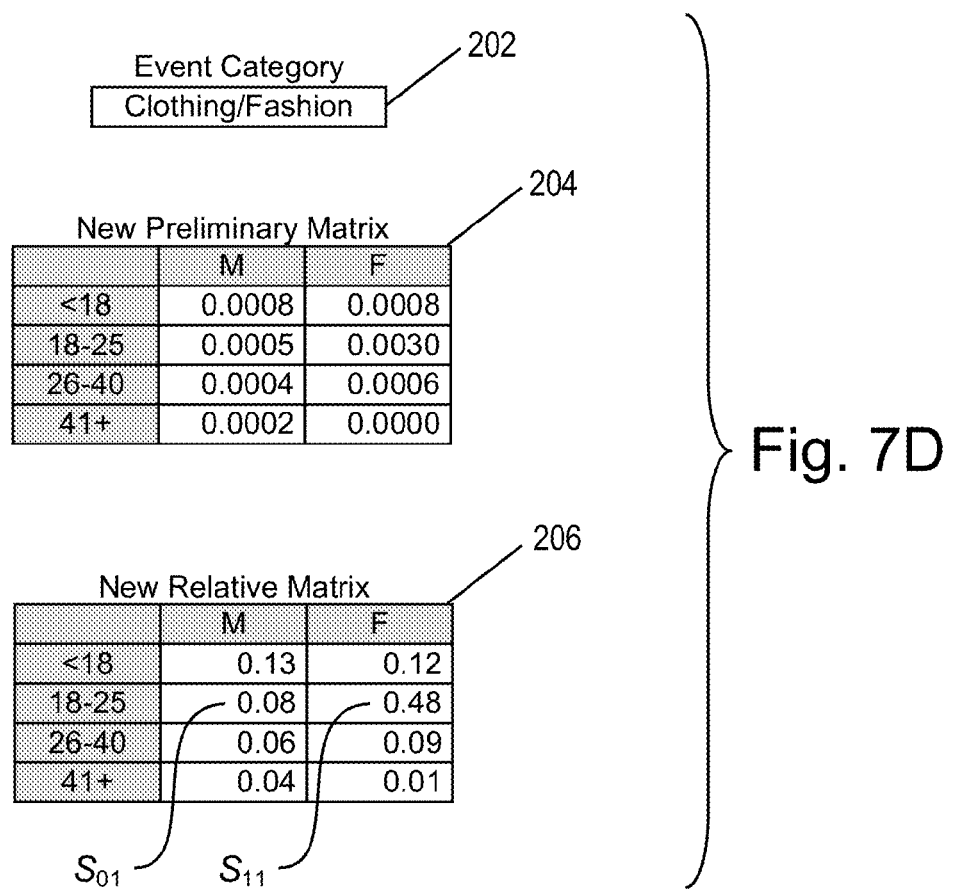

The next visited website corresponds to the Clothes/Fashion category 156c, and will be denoted Event 3. FIG. 7D shows the values that are generated as a result of Event 3. When Event 3 occurs, event category 202 is given a value corresponding to the Clothing/Fashion category. Because the value of event category 202 ("Clothes/Fashion") is different than the value of present device category 152 ("Sports/Football"), values for new preliminary matrix 204 and new relative matrix 206 are again generated using the present values of present device matrix 200 and the demographic profile 158 corresponding to event category 202 in the same manner discussed above. The results of these calculations are shown in FIG. 7D.

A new segment leader is again determined from new relative matrix 206. As shown in FIG. 7D, specific segment $S_{11}$ of new relative matrix 206 has the highest probability value of 0.48 (i.e., 48%) and is therefore the new segment leader. This corresponds to an 18-25 year old female. To determine our confidence level, we look at the increase of the value of the new segment leader $S_{11}$. The increase of new segment leader $S_{11}$ from present device matrix 200 shown in FIG. 7C, to new relative matrix 206 shown in FIG. 7D is 0.42 (0.48-0.06). Because this increase (0.42) is greater than the predetermined threshold (0.15), our confidence level is high that the segment leader of new relative matrix 206 should be used as the new segment leader for the device. As such, we can with confidence predict that the user has changed from a male, age unknown, to an 18-25 year old female. Thus, the method proceeds to step 196 and an alert is raised indicating a prediction that the user of mobile device 122 has changed.

After the alert has been raised, present device category 152 and present device matrix 200 are again updated respectively with the values of event category 202 and new relative matrix 206, and the method once again returns to steps 182, 184, and 186 to detect when a new category occurs. Table 2, below, provides a summary view for Example 1 and highlights the probable segment candidates of the device after each event has been processed, as reflected by the running present device matrix 200.

TABLE 2

Summary for Example 1

| Gender | Age | Segment | Event 1 Sports/Football | Event 2 Sports/News | Event 3 Clothes/Fashion |
|---|---|---|---|---|---|
| Male | <18 | $S_{00}$ | 20% | 24% | |
| Male | 18-25 | $S_{01}$ | 20% | 30% | |
| Male | 26-40 | $S_{02}$ | 20% | 24% | |
| Male | 41+ | $S_{03}$ | | | |
| Female | <18 | $S_{10}$ | | | |
| Female | 26-40 | $S_{11}$ | | | 48% |
| Female | 26-40 | $S_{12}$ | | | |
| Female | 41+ | $S_{13}$ | | | |

EXAMPLE 2

In Example 2, method 180 is again performed to predict when a change of users of mobile device 122 has occurred. In this Example, however, the outcome is a confirmation that a particular one of a possible plurality of segments applies. Similar to Example 1, we will use a predetermined threshold of 0.15. Steps 182, 184, and 186 are again performed each time a new website is visited by the browser until the category corresponding to the new website becomes different than the value of present device category 152.

Figure 8A:
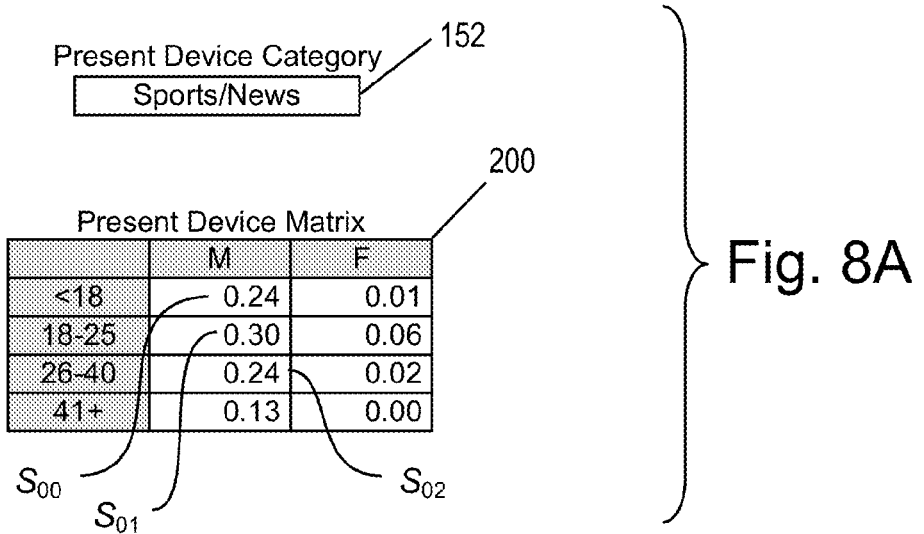
FIGS. 8A and 8B illustrate various category and matrix values corresponding to a second example using an embodiment of the present invention.

For Example 2, we will assume that Events 1 and 2 are the same as Events 1 and 2 of Example 1. As such, after Event 2 the values of present device category 152 and present device matrix 200 contain the same values as Example 1 did after Event 2. This is reflected in FIG. 8A. Thus, although segment $S_{01}$ has a highest value of 0.30 (i.e., 30%) in present device matrix 200, there is no clear segment leader, as segments $S_{00}$, $S_{01}$, and $S_{02}$ are all between 0.24 and 0.30.

Figure 8B:
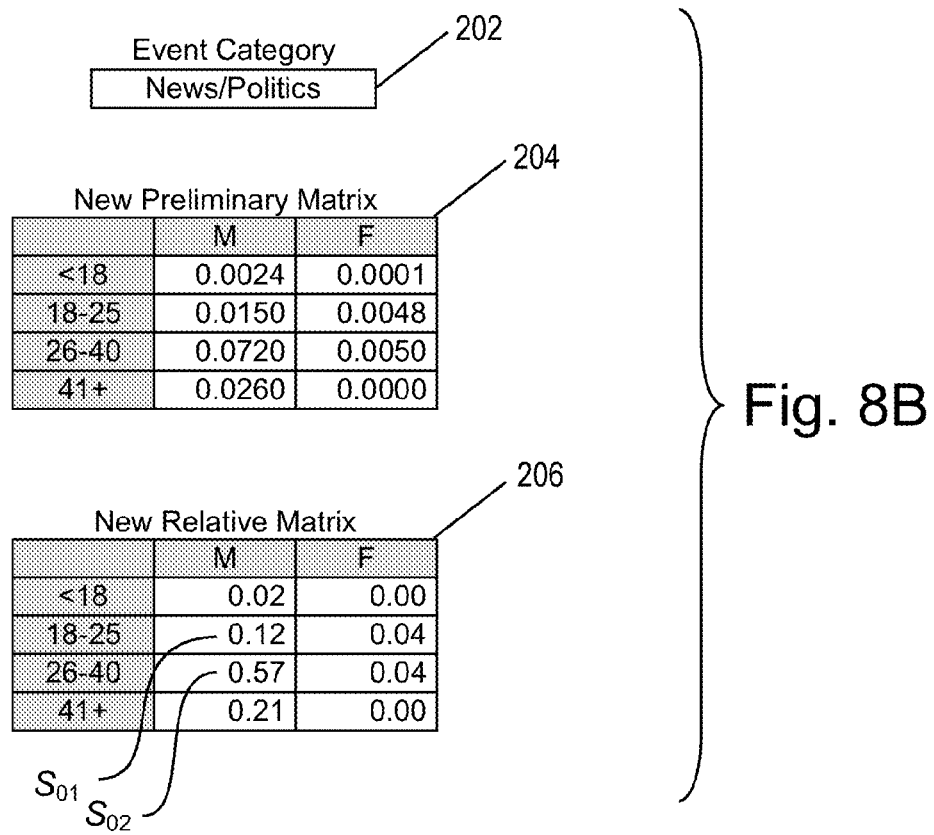

For new Event 3, the next visited website corresponds to the News/Politics category 156d instead of the Clothes/Fashion category 156c. FIG. 8B shows the values that are generated as a result of Event 3. When Event 3 occurs, event category 202 is given a value corresponding to the Clothing/Fashion category and values for new preliminary matrix 204 and new relative matrix 206 are generated using the present values of present device matrix 200 and the demographic profile 158 corresponding to event category 202 in the same manner discussed above. The results of these calculations are shown in FIG. 8B.

A new segment leader is determined from new relative matrix 206. As shown in FIG. 8B, specific segment $S_{02}$ of new relative matrix 206 has the highest probability value of 0.57 (i.e., 57%). As discussed above, specific segment $S_{02}$ of new relative matrix 206 is one of the specific segments of present device matrix 200 that is the present segment leader. However, the value of specific segment $S_{02}$ has now jumped up from 0.24 to 0.57, which is an increase of 0.33 from its previous value. Because this increase is greater than the predetermined threshold (0.15), our confidence level is now high that the user segment (and thus the user) corresponding to the device corresponds to the new segment leader candidate $S_{02}$. That is, we can with confidence predict that the user is a 26-40 year old male. Because after Event 2 we could only predict that the user was a male, we cannot accurately predict if there has been a change in users. However, now we are confident that the user likely belongs to the single segment $S_{02}$ (i.e., a 26-40 year old male) and can use that segment as the segment leader when the next event occurs. Table 3, below, provides a summary view for Example 2 and highlights the probable segment candidates of the device after each event has been processed, as reflected by the running present device matrix 200.

TABLE 3

Summary for Example 2

| Gender | Age | Segment | Event 1 Sports/Football | Event 2 Sports/News | Event 3 News/Politics |
|---|---|---|---|---|---|
| Male | <18 | $S_{00}$ | 20% | 24% | |
| Male | 18-25 | $S_{01}$ | 20% | 30% | |
| Male | 26-40 | $S_{02}$ | 20% | 24% | 57% |
| Male | 41+ | $S_{03}$ | | | |
| Female | <18 | $S_{10}$ | | | |
| Female | 18-25 | $S_{11}$ | | | |
| Female | 26-40 | $S_{12}$ | | | |
| Female | 41+ | $S_{13}$ | | | |

In Examples 1 and 2, the increase of the new segment leaders were compared to a predetermined threshold value (e.g., 0.15) to determine whether to predict that the segment leader of the device is the segment leader of new relative matrix 206. In an alternative approach, a ratio involving the new segment leaders can be compared to a predetermined ratio, as discussed above with respect to conditions 3b) and 3c) of the algorithm. For example, after each event the ratio of the new relative matrix value of the new segment leader to the new relative matrix value associated with the present segment leader can be compared to a predetermined ratio.

We can use Examples 1 and 2 to see how such an approach would affect the outcomes of those examples, using a predetermined ratio of 2.0. Before Event 3 in both Examples, the present segment leaders were segments $S_{00}$, $S_{01}$, and $S_{02}$, with segment $S_{01}$ having a slightly higher matrix value of 0.30. In Example 1, the new segment leader after Event 3 was segment $S_H$ having a value of 0.48 in new relative matrix 206, while the value in new relative matrix 206 of the present segment leader $S_{01}$ was 0.08, as shown in FIG. 7D. As such, the ratio of the new relative matrix values of the new segment leader candidate $S_{11}$ to present segment leader $S_{01}$ is 0.48 to 0.08, which equals 6.0. Because the ratio is greater than the predetermined ratio of 2.0, our confidence level is again high that the user segment (and thus the user) corresponding to the device has changed.

In Example 2, the new segment leader after Event 3 was segment $S_{02}$ having a value of 0.57 in new relative matrix 206, while the value in new relative matrix 206 of present segment leader $S_{01}$ was 0.12, as shown in FIG. 8B. As such, the ratio of the new relative matrix values of the new segment leader $S_{02}$ to present segment leader $S_{01}$ is 0.57 to 0.12, which equals 4.8. Because the ratio is greater than the predetermined ratio of 2.0, our confidence level is again high that the user segment (and thus the user) corresponding to the device corresponds to the new segment leader candidate $S_{02}$.

Thus, as shown above, the alternative approach of using a ratio for comparison can also give us confidence regarding a prediction of a user change.

As we have now shown, embodiments of the present invention can provide many unique benefits not found in conventional devices or methods. By way of example and not limitation, we have shown that historical usage of the network enabled device can be taken into account without having to save or store information corresponding to each past usage, information corresponding to different users of the network enabled device does not need to be saved or even used, and the methods and information required to predict a change of users of the network enabled device can be performed and stored on the network side.

As a result, many benefits are realized. For example, a change of users of the network enabled device can be predicted based solely on overall usage of the network enabled device, without determining or saving information corresponding to each particular user, and no applications or data need to run or be stored on the network enabled device. Because of this, embodiments of the present invention can be incorporated into present networks without requiring any changes to be made to the network enabled devices presently using the networks.

Many other benefits are also realized, as discussed above. For example, alerts of likely user changes provided by embodiments of the present invention can be used to maintain dynamic advertising profiles based on the real users of the devices, protect minors from offensive content, detect if and when a device is loaned or used by others, and detect if and when a device is stolen. Of course, other benefits can also be realized.

It is to be understood that features described with regard to the various embodiments herein may be mixed and matched in any combination without departing from the spirit and scope of the invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of predicting a change of users of a network enabled device, a present device category and a present device matrix respectively corresponding to a category and demographic profile associated with the network enabled device, the present category being one of a plurality of predefined categories corresponding to groups of similar network events, each predefined category having a demographic profile associated therewith, the present device matrix having a present segment leader, the method comprising:
    detecting a network event corresponding to the network enabled device;
    determining an event category corresponding to the detected network event, the event category being one of the plurality of predefined categories;
    comparing the event category with the present device category; and
    when the event category differs from the present device category:
        calculating a new relative matrix based on the present device matrix and the demographic profile associated with the event category;
        determining a new segment leader corresponding to the new relative matrix;
        determining an increase of value of the new segment leader;
        comparing the new segment leader to the present segment leader and the increase of value of the new segment leader to a predetermined threshold value; and
        when the new segment leader differs from the present segment leader and the increase of value is greater than the predetermined threshold value, setting forth an alert predicting a change of users of the network enabled device.

2. The method recited in claim 1, wherein the present device matrix and the new relative matrix each comprise a plurality of segments, each segment having a probability value corresponding to a specific demographic.

3. The method recited in claim 2, wherein the new segment leader is the segment of the new relative matrix having the largest value.

4. The method recited in claim 3, wherein determining an increase of value of the new segment leader comprises:
   determining a segment value of the new segment leader in the new relative matrix;
   determining a segment value of the new segment leader in the present matrix; and
   determining the difference between the segment values of the new segment leader.

5. The method recited in claim 2, wherein the present segment leader is the segment of the present device matrix having the largest value.

6. The method recited in claim 1, wherein calculating the new relative matrix comprises:
   calculating a preliminary matrix; and
   normalizing the preliminary matrix to obtain values for the new relative matrix.

7. The method recited in claim 6, wherein calculating the preliminary matrix comprises multiplying the present device matrix by the demographic profile associated with the event category.

8. The method recited in claim 6, wherein normalizing the preliminary matrix comprises dividing each entry of the preliminary matrix by the sum of the entries of the preliminary matrix.

9. The method recited in claim 1, wherein setting forth the alert comprises transmitting a message to a network application indicating that a change of users has likely occurred on the network enabled device, the message including an indication of a demographic segment to which the new user of the network enabled device likely belongs.

10. A method of monitoring for a change of users of a network enabled device, a present device category and a present device matrix respectively corresponding to a running category and running demographic profile associated with the network enabled device, a predetermined threshold being associated with the network enabled device, the present category being any one of a plurality of predefined categories corresponding to groups of similar network events, each predefined category having a demographic profile associated therewith, the present device matrix having a present segment leader, the method comprising:
   continuously performing the following method:
      detecting a network event corresponding to the network enabled device;
      determining an event category corresponding to the detected network event, the event category being one of the plurality of predefined categories;
      comparing the event category with the present device category; and
      when the event category differs from the present device category:
         calculating a new relative matrix based on the present device matrix and the demographic profile associated with the event category;
         determining a new segment leader corresponding to the new relative matrix;
         determining an increase of value of the new segment leader;
         comparing the new segment leader to the present segment leader and the increase of value of the new segment leader to the predetermined threshold value;
         when the new segment leader differs from the present segment leader and the increase of value is greater than the predetermined threshold value, setting forth an alert predicting a change of users of the network enabled device; and
         updating the present device category and the present matrix to respectively equal the event category and the new relative matrix.

11. The method recited in claim 10, wherein calculating the new relative matrix comprises:
   calculating a preliminary matrix; and
   normalizing the preliminary matrix to obtain values for the new relative matrix.

12. The method recited in claim 11, wherein calculating the preliminary matrix comprises multiplying the present device matrix by the demographic profile associated with the event category.

13. The method recited in claim 11, wherein normalizing the preliminary matrix comprises dividing each entry of the preliminary matrix by the sum of the entries of the preliminary matrix.

14. The method recited in claim 10, wherein the method is performed by a network device other than the network enabled device.

15. A method of predicting a change of users for each of a plurality of network enabled devices of a network, the method comprising:
   performing, by the network, the method recited in claim 10 for each network enabled device.

16. A network enabled device configured to monitor a plurality of communication devices over a network, the network device comprising:
   a processor; and
   memory, the memory having stored thereon a plurality of demographic profiles, each corresponding to one of a plurality of predefined categories corresponding to groups of similar network events, a present device category selected from one of the plurality of predefined categories based on recent network events corresponding to the communication device, a present device demographic profile based at least in part on the present device category, and a present device matrix having a present segment leader,
   the memory having stored thereon executable instructions that, when executed by the processor, cause the network enabled device to perform the following:
   detect a network event corresponding to the network enabled device;
   determine an event category corresponding to the detected network event, the event category being one of the plurality of predefined categories;
   comparing the event category with the present device category; and
   when the event category differs from the present device category:
      calculating a new relative matrix based on the present device matrix and the demographic profile associated with the event category;
      determining a new segment leader corresponding to the new relative matrix;

determining an increase of value of the new segment leader;

comparing the new segment leader to the present segment leader and the increase of value of the new segment leader to a predetermined threshold value; and when the new segment leader differs from the present segment leader and the increase of value is greater than the predetermined threshold value, setting forth an alert predicting a change of users of the network enabled device.

17. A network enabled device configured to monitor a plurality of communication devices over a network, the network device comprising:

a processor; and memory, the memory having stored thereon a present device category and a present device matrix respectively corresponding to a running category and running demographic profile associated with the network enabled device, and a predetermined threshold being associated with the network enabled device, the present category being any one of a plurality of predefined categories corresponding to groups of similar network events, each predefined category having a demographic profile associated therewith, the present device matrix having a present segment leader, the memory having stored thereon executable instructions that, when executed by the processor, cause the network enabled device to continuously perform the following:

detect a network event corresponding to the network enabled device;

determine an event category corresponding to the detected network event, the event category being one of the plurality of predefined categories;

compare the event category with the present device category; and when the event category differs from the present device category:

calculate a new relative matrix based on the present device matrix and the demographic profile associated with the event category;

determine a new segment leader corresponding to the new relative matrix;

determine an increase of value of the new segment leader;

compare the new segment leader to the present segment leader and the increase of value of the new segment leader to the predetermined threshold value;

when the new segment leader differs from the present segment leader and the increase of value is greater than the predetermined threshold value, set forth an alert predicting a change of users of the network enabled device; and update the present device category and the present matrix to respectively equal the event category and the new relative matrix.

\* \* \* \* \*